134-22.19 SR
7/7/87 03 1 000.300

United States Statutory Invention Registration [19]

[11] Reg. Number: H300
[43] Published: Jul. 7, 1987

Hearst

[54] STRIPPING AGENT FOR CHEMICALLY RESISTANT COATINGS

[75] Inventor: Peter J. Hearst, Oxnard, Calif.

[73] Assignee: The United States of America as represented by the Secretary of the Navy, Washington, D.C.

[21] Appl. No.: 928,777

[22] Filed: Nov. 4, 1986

[51] Int. Cl.[4] ..... B08B 9/08; C11D 1/66; C11D 3/26; C23G 5/02

[52] U.S. Cl. ..... 134/22.19; 252/548; 252/153; 252/542; 252/171; 252/DIG. 8

*Primary Examiner*—John F. Terapane
*Assistant Examiner*—J. E. Thomas
*Attorney, Agent, or Firm*—Louis Allahut; Joseph M. St.Amand

[57] ABSTRACT

A low viscosity, non-foaming stripping composition comprising by volume 79% N-methylpyrrolidone, 20% monoethanolamine and 1% non-ionic surface active agent is applied at elevated temperatures (around 180 degrees F.) for removing thick (e.g., 10-mil) epoxy coatings and similar chemically resistant coatings from steel surfaces, and is suitable for spray application and for recycling.

21 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

STRIPPING AGENT FOR CHEMICALLY RESISTANT COATINGS

The present invention relates to stripping agents for removing epoxy coatings and similar chemically resistant coatings from steel surfaces. The invention is particularly intended for spraying at elevated temperatures of around 180 degrees F. and is suitable for recycling of the stripping solution.

This invention is also particularly intended for use with bilge and tank cleaning systems, such as disclosed in U.S. Pat. No. 4,530,131, issued July 23, 1985, for an Automatic Vacuum Recyclable System for Chemical-Thermo Cleaning of Ship Tanks and Bilges, and is commonly assigned. The system in the patent sprays and recirculates hot solutions for cleaning, stripping, derusting, and passivating tanks and bilges. Typically 500 gallons of solution are sprayed within tanks at 50 gpm, at 100 psi, and at 180 degrees F. through a set of nozzles. The solutions can also be sprayed by a hand lance at 2000 psi, for example.

The only effective prior methods for removing thick epoxy coatings from steel tanks in ships have been by sandblasting or by the use of needleguns. Sandblasting is environmentally undesirable because of air pollution or heavy metal water pollution. Needleguns are very tedious and less effective. Hot alkaline solutions can be used in spray applications to remove alkyd coatings, but are not very effective in spray removal of epoxy type and similar chemically resistant coatings.

Previously available epoxy stripping agents have been generally intended for stripping items by immersion into a bath of the stripping agent. Such stripping agents may contain methylene chloride, phenols, formic acid, or other acidic or alkaline materials. These stripping agents and others that are used at elevated temperatures are frequently so volatile that they must be used with a mineral oil seal to reduce evaporation. Because of their volatility and because of the presence of toxic components, such stripping agents are not suitable for spraying in systems, such as aforementioned, nor can a mineral oil seal be used.

There is a great need for epoxy stripping agents for use in spraying systems, such as in the bilge and tank cleaning system mentioned above, and therefore, the stripping agent must necessarily be of relatively low viscosity, non-foaming, and cannot be thick or paste-like as are many commercially available prior type stripping agents.

SUMMARY OF THE INVENTION

This invention provides a suitable stripping agent for use in spray type systems to remove thick (e.g., 10 mil) epoxy type and similar chemically resistant coatings. The stripping agent is composed of N-methylpyrrolidone and ethanolamine together with a suitable surface active agent. The preferred composition consists (by volume) of about 79% N-methylpyrrolidone, 20% ethanolamine, and 1% of a non-ionic surface active agent, such as Igepal C0630. Igepal C0630 is a non-ionic detergent (based on nonylphenol and 9 moles of ethylene oxide) and was chosen for its resistance to alkaline environments and for not producing foam during the spraying process. This type of surface active agent while operating to increase penetration and undercutting of the coatings to be removed, has a high resistance to degradation by the alkaline environment caused by ethanolamine in the stripping composition.

An important feature is to provide a non-foaming, low viscosity, stripping solution suitable for spraying application in tanks and bilges to remove epoxy and similar type chemically resistant coatings.

Another desirable feature is that this stripping agent is water-soluble and can be removed by water rinsing to allow further aqueous surface preparation of steel tank surfaces, such as derusting with citric acid and passivation with dilute triethanolamine solution. In addition, the stripping agent is generally recyclable.

DESCRIPTION OF THE PREFERRED EMBODIMENTS

The composition of the stripping agent of the present invention comprises N-methylpyrrolidone (produced by GAF Corporation under the tradeiame of M-Pyrol), together with ethanolamine (also called monoethanolamine) to provide alkalinity, and a non-ionic surface active agent(s).

Ethanolamine is preferred over diethanolamine since ethanolamine, being more alkaline, is more aggressive than diethanolamine and improves the stripping action, as shown in Table 1, below. The ethanolamine has a lower boiling point and greater volatility than diethanolamine. Ethanolamine, in addition to being very caustic, is toxic in air; however, when used in a controlled environment, such as the spray type system used for cleaning enclosed tanks, the recycling process of the spray system keeps losses within required limits. Nevertheless, precaution must always be taken in handling any strongly alkaline solutions.

Igepal C0630 is a non-ionic surfactant consisting of nonylphenol reacted with 9 moles of ethylene oxide, and is produced by GAF. A counterpart to Igepal C0630 is Tergitol NP-9, which is also a non-ionic surfactant (a nonylphenol ethoxylate), and is produced by Union Carbide.

Because the rate of coating removal is very dependent upon the temperature, the coating surface temperature should be monitored. Measurement of the temperature of the runoff spray solution and of the tank wall being stripped is desirable. The difference of a mere 20 degree F. (e.g. 160 degrees F. instead of 180 degrees F.) has been found to increase the stripping time by 5 hours in some instances. This is shown in Table 1, in which is listed the temperature of the stripping agents as measured at the nozzle assembly with a thermocouple.

The time required for stripping is also strongly affected by the presence of water. The addition of 10% water to the preferred composition nearly triples the time required. This has the same effect on the stripping rate as lowering the temperature about 14 degrees F. Since the presence of water reduces the effectiveness of the stripping solution, the tank or other area from which the solution is recirculated should preferably be dry or nearly dry before the stripping agent is used. Another reason for keeping the tank dry is the fact that monoethanolamine solutions are corrosive to carbon steel. However, in the short contact time of the process used, this effect should not be critical.

Removal of chemically resistant coatings by immersion is much less rapid than removal by spraying, as shown in Table 1 below. An effective spraying pressure range is 50 to 100 psi. As the spraying pressure is increased the rate of coating removal is increased.

The temperature range at which the stripping composition should be applied for satisfactory results is from approximately 170 to 190 degrees F., the preferred temperature being around 180 degrees F. The application temperature, however, should always be set at a safe point below the flash point of approximately 195 degrees F. for the stripping composition.

Several solutions may be used with spray type systems, as aforementioned. Table 1, which follows, compares several solutions using both spraying system and immersion bath techniques. A number of commercially available stripping agents are compared with N-methylpyrrolidone alone, and with the preferred solution at various temperatures, in stripping 10-mil epoxy polyamide coatings from 3 inch by 6 inch by 1/16th inch thick, cold rolled steel test panels.

TABLE 1

Epoxy Coating Removal With Stripping Agents

| Stripping Agent Composition | Coating Removal by Spray (1) at Undamaged Area | Coating Removal by Spray (1) at Scribed Area | Coating Removal by Immersion (2) |
|---|---|---|---|
| Commercial - A: 50% water, 38% furfuryl alcohol 6.3% KOH, etc. | no effect in in ½ hour | no effect in ½ hour | no removal (slight edge lifting) in 4 hours |
| Commercial - B: an amine plus unspec. ingred. | 15% of total coating | 85% of total Coating | 100% removed in 4 hours |
| Commercial - C: 30% ethanolamine 5% KOH, etc. | negligible | 3% at edges & scribes | 95% blistered in 4 hours |
| NMP = N—methyl-pyrrolidone | 10% of total; 60%/topcoat | 30%/total; 90%/topcoat | 15% of total & 75% of topcoat in 4 hours |
| 79.2% NMP, 19.8% diethanolamine, 1% Igepal CO630 | 8% of total at edges; 10% topcoat pitting | 25%/total; 7% topcoat pitting | 5% at edges in 4 hours |
| H3C = 79.2% NMP, 19.8% ethanolamine, plus 1% Igepal CO630 | 100% in 1.25 hours | 100% in 1.5 hours | 90% in 2.5 hrs & 100% removed in 3.5 hours |
| 90% H3C, 10% $H_2O$ | 85% of total | 95% of tot. | 25% removed in 4 hours |
| H3C at 170 deg. F. | 100% of total | 100% in 2.75 hours | 2 to 35% in 4 hours |
| H3C at 160 deg. F. | 2% of total; 1% of top-coat pitting | 15% of total; 100% in 6 hours | removed at edges only in 4 hours |

(1) Visually estimated coating removal after 3 hours of spraying at 180 degrees F. and 50 psi nozzle pressure, except as otherwise noted.
(2) Estimated coating removal at portion immersed in stirred stripping agent at 180 degrees F. for 4 hours, except as otherwise noted.

As shown, the stripping agent of this invention for use in spray type systems has been found to be more effective and more efficient than prior type stripping agents. The use of both N-methylpyrrolidone (79%) and ethanolamine (20%), together with a non-ionic surface active agent (1%) as aforementioned, provides a stripping composition which is very effective in removing chemically resistant epoxy coatings from tanks and bilges using spray apparatus. This eliminates the need for immersion type cleaning, which involves excessive amounts of solution for bilge and tank type cleaning and which, therefore, would be impractical. The present solution is non-foaming. In a recycling spraying system, foam hinders and greatly slows down the stripping action. Foaming type agents are not suitable in spray type systems, as foam will fill a chamber quickly, and cannot be recycled efficiently.

For use as a spray type stripping agent that is recyclable, it is important, as previously mentioned, that the solution have low viscosity, and that it efficiently cover, act on, and remove the epoxy coating. The solution also needs to be water soluble for subsequent rinse operations. All these qualities are found in the preferred embodiment described above.

Satisfactory results have been obtained within ranges of approximately: 77 to 80 percent N-methypyrrolidone, 19 to 22 percent monoethanolamine and 1 percent non-ionic surface active agent. A wider composition range is possible, although the preferred percentages of ingredients for the stripping composition are 79, 20 and 1 percent, respectively.

Using the system disclosed in the aforementioned U.S. Pat. No. 4,530,131, the stripping agent can be used many times by adjustment of the composition to maintain the proper proportions of ingredients. Spent solutions, if desired, may be reclaimed by distillation. In such a distillation, any water from the tanks or bilges would first be removed, then the ethanolamine would be obtained, and last the N-methylpyrrolidone would be distilled.

Obviously many modifications and variations of the present invention are possible in the light of the above teachings. It is therefore to be understood that within the scope of the appended claims, the invention may be practiced otherwise than as specifically described.

What is claimed is:

1. A low viscosity stripping composition, suitable for application by spraying at elevated temperatures, for the removal of chemically resistant coatings, the mixture comprising:

(a) 79 percent by volume of N-methylpyrrolidone;
(b) 20 percent by volume of ethanolamine; and
(c) 1 percent by volume of a non-ionic surface active agent for increasing penetration of the coating and without producing foam during spraying.

2. A stripping composition as in claim 1 wherein the surface active agent is a non-ionic detergent having high resistance to the alkaline environment caused by ethanolamine in the stripping composition.

3. A stripping composition as in claim 1 wherein the temperature at which said stripping composition is to be applied to chemical resistant coatings to be removed is at a range of 170 to 190 degrees F.

4. A stripping composition as in claim 3 wherein the preferred temperature is 180 degrees F.

5. The method for removing chemically resistant coatings from walls of bilges and tanks, comprising:

(a) spraying the chemically resistant coatings within said bilges and tanks with a stripping composition comprised by volume of approximately 79 percent N-methylpyrrolidone, 20 percent ethanolamine, and 1 percent of a non-ionic surface active agent;
(b) said stripping composition being applied by spraying onto said chemically resistant coatings to be removed at a temperature range of 170 to 190 degrees F.;
(c) removing the used said stripping composition along with removed coating material for recycling of the stripping composition.

6. A method as in claim 5 wherein said non-ionic surface active agent is a non-ionic detergent having high resistance to the alkaline environment caused by said ethanolamine in the stripping composition and not producing foam during spraying.

7. A method as in claim 5 wherein said non-ionic surface active agent is chosen to increase penetration and undercutting of the coating to be removed, and to have high resistance to degradation in an alkaline environment while not producing foam during spraying.

8. A method as in claim 5 wherein the stripping composition is applied to the coating at a preferred temperature of 180 degrees F.

9. A method as in claim 5 wherein the ingredients of said stripping composition are recovered by distillation.

10. A method as in claim 5 wherein said stripping composition is sprayed onto chemical resistant coatings to be removed at a pressure range of approximately 50 to 100 psi or greater.

11. A method as in claim 10 wherein a preferred rate of application of said stripping composition in tanks is 50 gpm.

12. A low viscosity stripping composition, suitable for application by spraying at elevated temperatures, for the removal of chemically resistant coatings, the mixture comprising:

(a) 77 to 80 percent by volume of N-methylpyrrolidone;
(b) 19 to 22 percent by volume of ethanolamine; and
(c) 1 percent by volume of a non-ionic surface active agent for increasing penetration of the coating to be removed without producing foam during spraying.

13. A stripping composition as in claim 12 wherein the surface active agent is a non-ionic detergent having high resistance to the alkaline environment caused by ethanolamine in the stripping composition.

14. A stripping composition as in claim 12 wherein the temperature at which said stripping composition is to be applied to chemical resistant coatings to be removed is at a range of 170 to 190 degrees F.

15. A stripping composition as in claim 12 wherein the preferred temperature is 180 degrees F.

16. The method for removing chemically resistant coatings from walls of bilges and tanks, comprising:

(a) spraying the chemically resistant coatings within said bilges and tanks with a stripping composition comprised by volume of approximately 77 to 80 percent N-methylpyrrolidone, 19 to 22 percent ethanolamine, and 1 percent of a non-ionic surface active agent;
(b) said stripping composition being applied by spraying onto said chemically resistant coatings to be removed at a temperature range of 170 to 190 degrees F.;
(c) removing the used said stripping composition along with removed coating material for recycling of the stripping composition.

17. A method as in claim 16 wherein said non-ionic surface active agent is chosen to increase penetration and undercutting of the coating to be removed, and have high resistance to degradation in the alkaline environment caused by the ethanolamine in the stripping composition while not producing foam during spraying.

18. A method as in claim 16 wherein the stripping composition is applied to the coating at a preferred temperature of 180 degrees F.

19. A method as in claim 16 wherein the ingredients of said stripping composition are recovered by distillation following removal of removed coating material.

20. A method as in claim 16 wherein said stripping composition is sprayed onto chemical resistant coatings to be removed at a pressure range of approximately 50 to 100 psi or greater.

21. A method as in claim 16 wherein said non-ionic surface active agent consists of nonylphenol reacted with 9 miles of ethylene oxide.

* * * * *